US005729824A

United States Patent [19]

O'Neill et al.

[11] Patent Number: 5,729,824
[45] Date of Patent: Mar. 17, 1998

[54] DISTRIBUTED DIGITAL LOOP CARRIERS SYSTEM USING COAXIAL CABLE

[75] Inventors: John F. O'Neill; J. Mark Elder, both of Boulder, Colo.; Stephen H. Diaz, Palo Alto, Calif.; Joseph M. Carey, Longmont, Colo.; James A. Pinyan, Los Altos, Calif.

[73] Assignee: Raychem Corporation, Menlo Park, Calif.

[21] Appl. No.: 353,541

[22] Filed: Dec. 9, 1994

[51] Int. Cl.⁶ .................. H04N 7/10; H04N 7/14; H04J 15/00; H03H 7/46
[52] U.S. Cl. .................. 455/3.1; 333/111; 333/132; 348/6; 348/12; 348/14; 370/26; 455/5.1; 455/6.1; 455/6.3
[58] Field of Search ............... 348/6, 7, 10, 12, 348/13, 14; 455/3.1, 4.1, 4.2, 5.1, 6.1, 6.2, 6.3; 370/94.1, 94.3, 26, 29, 37; 333/109, 110, 132; H04N 7/10, 7/14

[56] References Cited

U.S. PATENT DOCUMENTS

| | | | |
|---|---|---|---|
| 4,947,386 | 8/1990 | Preschutti | 370/26 |
| 4,970,722 | 11/1990 | Preschutti | 370/94.3 |
| 5,029,333 | 7/1991 | Graves et al. | 370/58.1 |
| 5,124,980 | 6/1992 | Maki | 370/77 |
| 5,142,532 | 8/1992 | Adams | 370/94.1 |
| 5,189,673 | 2/1993 | Burton et al. | 370/110.1 |
| 5,218,603 | 6/1993 | Watanabe | 370/85.13 |
| 5,263,021 | 11/1993 | Ortel | 370/74 |
| 5,343,240 | 8/1994 | Yu | 348/14 |
| 5,355,401 | 10/1994 | Skinner, Sr. | 379/56 |
| 5,361,394 | 11/1994 | Shigihara | 455/5.1 |

FOREIGN PATENT DOCUMENTS

| | | | |
|---|---|---|---|
| 9220648 | 2/1993 | Australia | H04N 1/08 |
| 1130642 | 5/1989 | Japan | H04H 1/08 |
| 3179821 | 5/1991 | Japan | H04B 3/38 |
| 4017483 | 1/1992 | Japan | H04N 7/22 |
| 5308358 | 11/1993 | Japan | H04L 12/28 |
| 2252022 | 7/1992 | United Kingdom | H04H 1/08 |
| 2263041 | 7/1993 | United Kingdom | H04M 11/08 |
| 2263844 | 8/1993 | United Kingdom | H04N 7/10 |

OTHER PUBLICATIONS

Famnet: an integrated voice and data network, 8049E — IEE Proceedings, Section E 134(1987) Jan., No. 1, Part E, Stevenage, Herts, Gr. Britain.

Application of return channel for telecommunication, Sudhir Gupta, Robert Bosch, Berlin. Symposium Record, CATV sessions, 16th International TV Symposium, Montreux, Switzerland, 17–22 Jun. 1989.

Primary Examiner—John K. Peng
Assistant Examiner—John W. Miller
Attorney, Agent, or Firm—Herbert G. Burkard; Bruce M. Bertram; Townsend and Townsend and Crew

[57] ABSTRACT

A low power, low cost distributed digital loop (DDL) carrier system that combines television and voice telephone signal transmission over coaxial cables. The DDL system employs a passive/active tap module (114) that controls the steering of the video and telephone signals. The high frequency down stream telephone signal is not processed until a routing terminator (110) converts it to lower frequency signal for transmission in the lower frequency subsplit channel. The telephone signal is then transmitted back up through the subsplit where the active circuitry of each tap intercepts the telephone signal, selects the needed signal and transmits it down to a network interface unit (120) located at the subscriber premises.

26 Claims, 8 Drawing Sheets

DISTRIBUTED DIGITAL LOOP CARRIERS SYSTEM USING COAXIAL CABLE

BACKGROUND OF THE INVENTION

The present invention relates in general to communication systems, and in particular to a digital loop carrier system based on a distributed architecture using coaxial cable as the primary transmission medium.

Recent trends in consolidation of the communication and entertainment industries have led to a technological trend to supply voice telephone service via coaxial cable systems that are usually designed for entertainment delivery and administration. There are, however, several obstacles in combining these two disparate types of communication systems.

The newer cable television (CATV) networks typically employ a hybrid optical/coaxial transmission medium. The optical signal is transmitted through a fiber optics channel to an optic/electric node that converts it to electronic signal. From that point on, coaxial cables are used to distribute the electronic signal throughout the network. The frequency spectrum of the coaxial cable is divided at around 50 MHz separating the downstream or supersplit video, voice and data signals (50 MHz up to 1000 MHz) from the upstream or subsplit channel (5 MHz to 50 MHz) that is used for network administration (billing, program ordering, etc.). Directional signal couplers (or taps) are provided along the transmission lines to allow for customer access to the full bandwidth of the downstream signals as well as access to inject appropriate upstream signals. Each tap acts as a multi-way (e.g., four-way or eight-way) splitter, providing several outlets to drop separate coaxial cables down to different subscribers. The coaxial drop goes through a ground block to ground its shield and then connects to subscriber circuitry. Each drop removes a portion of the signal power (e.g., 5 dB) as the signal travels along the transmission channel. There is further signal attenuation due to the lossy nature of the coaxial cable. The signal must therefore be amplified by an amplifier typically placed after every five to ten taps along the channel. This amplifier amplifies signals in both directions, the downstream high frequency supersplit signal and the upstream lower frequency subsplit signal.

To include telephone service in the same coax cable, it is necessary to accommodate voice signals moving both downstream (from the central office to the subscriber) and upstream (from the subscriber to the central office). In the typical system the downstream and upstream telephone signals are handled in the same way as the video signals, with the downstream data carried in the supersplit channel and the upstream data carried in the subsplit channel. To receive and transmit telephone signals using the existing CATV network, the options are somewhat limited. Typically, a telephony circuit box inserted along the coaxial drop must be installed at each subscriber location. The telephony circuit box must include amplifiers, filters, two high frequency modulator-demodulators (MODEMs), for the upstream and downstream signals the usual line circuit, power supply circuitry, etc. The box then connects to a subscriber telephone set via a twisted wire pair.

This system, however, suffers from several major drawbacks. The service availability standards and customer expectations differ significantly between the two communication systems. System unavailability can be caused by component failure, natural disaster, human error, etc. In CATV practice, these causes of system unavailability are compounded by the larger outage time associated with routine addition of new subscribers. It is considered acceptable for CATV systems to disconnect service from some customers in order to add new customers. To add a new subscriber in conventional CATV technology often requires the craftsperson to cut the cable in order to insert another tap. This makes the service unavailable to all downstream customers and, due to reflections from impedance mismatch, possibly some upstream customers. Although current CATV practice provides for preinstallation of tap boxes where it can be predicted that a customer may need access, actual insertion of the functional part of the tap also cuts the cable and creates service disturbance for all downstream and some upstream customers. Telephone services, on the other hand, have a very stringent availability standard of 99.99% of the time. This standard allows less than one hour of unavailability per line per year for telephone systems.

A related problem is caused by the fact that because conventional taps use passive components, the amount of loss they insert into the through-going signal varies depending on the portion of the signal they must remove from the main line to deliver an adequate signal to the attached subscriber. A tap placed at a low level signal point must remove a larger portion of the signal to provide the customer with enough energy and thus creates more through loss than a tap placed at a high signal level point on the cable. Thus, depending on its location, each tap is designed to extract a different ratio of the signal. The additional loss due to the insertion of a new tap, therefore, frequently requires reconfiguring the tap ratios for the downstream taps. Each of these adjustments interrupts the service.

Noise ingress is a major problem in the upstream direction. In the downstream direction there is only one point of entry and this is located in a central office or other protected location. But in the upstream direction there is a port of entry at each subscriber site, where the drop cable is attached to the subscriber electronics. Electronic noise from TV sets, outdoor antennas, HAM radios, cordless phones, etc., can easily enter the system at this point. It is also well known in the industry that the drop cable itself is the most frequent cause of signal leakage into (and out of) the system. Noise ingressing from each of many subscriber drop cables adds together in the main cable and is amplified as it moves upstream, interfering with the upstream signals. Once useful signals are tainted by the noise, it is difficult to separate them, particularly by means of passive devices such as the taps used in CATV systems. The combination of the above conditions creates a very poor transmission environment in terms of noise for the upstream signals.

Power and cost are among other drawbacks of such a system. Telephone lines are central office powered. That is, if the regular power from the local utility supplier is disconnected, the telephone lines must remain powered and operational. Thus, an uninterruptable power source must be provided to supply power through the coaxial cable network to the telephone circuitry. Due to the relatively large amount of circuitry required by the typical telephony circuit box, most of which must operate at high frequencies, a considerable amount of power is consumed by the telephony circuit box. Thus, high voltages must be transmitted via the coaxial cables to power this circuitry. Also, because this scheme requires one of these boxes for each subscriber, given the high frequency components of the box, the system tends to be very expensive. Therefore, cost and power delivery and consumption are among some of the other problems associated with using the existing CATV network for transmission of telephone signals.

Another consideration is the format in which data are transmitted. Time division multiplexing (TDM) is one of the preferred methods of transmitting data because it is very efficient and is also well supported by the industry. TDM does, however, require the very accurate timing of the multiple input sources so that they may be "interleaved" without collisions. Thus, given the structure of the existing CATV networks, to use TDM, the system would have to make provisions to address what is referred to as the ranging problem. Because subscribers are located at varying distances from the taps, the amount of delay in signal transmission varies from subscriber to subscriber. Thus, the system must be able to calculate and take into account the different delays for different subscribers in order to use TDM. This adds to the overhead and complexity of the system. Alternatives to TDM are frequency division multiplexing and data packets, neither of which suffers from the ranging problem. However, these formats are more expensive to implement, require more power and are not as efficient as TDM.

There is, therefore, a need for an efficient, cost-effective and reliable digital loop carrier system that carries both cable television and telephone signals, and meets the system availability requirements of telephone services.

SUMMARY OF THE INVENTION

The present invention provides a low power, low cost, highly efficient distributed digital loop (DDL) carrier system that combines television and voice telephone signal transmission over coaxial cables.

The DDL system of the present invention addresses a number of the problems associated with the existing CATV system by utilizing a distributed architecture that uses a unique passive/active tap module. Each tap module includes a low-loss, passive in-cable directional coupler and an active signal treatment device or distribution unit (DU) that is preferably detachable. The in-cable passive access device provides a bypassing mechanism that is activated when the DU is detached to allow the downstream signal to pass through with minimum disturbance. The DU incorporates active circuitry including amplifiers, modulator/demodulators, and filters that extract the right telephone signal and transmit it down one of the several (e.g., four) cable drops to a network interface unit (NIU) located at each subscriber premises. This arrangement minimizes system unavailability during tap insertions, maintenance, or circuit failures, and permits the sharing of signal access electronics by several subscribers to save power and cost.

Further reductions in power consumption and cost are made possible by the use of a special routing terminator. The DDL system of the present invention is designed to allow each tap to extract a portion of the high frequency signal as it is transmitted downstream. The extracted video signal is subsequently processed while the high frequency telephone signal remains unprocessed. Once the telephone signal reaches the end of the cable, a routing terminator (RT) receives the signal and demodulates it down to digital baseband. The RT processes the digital signal and reconstructs it as a noise-free signal. The RT then remodulates the reconstructed digital signal with a carrier frequency in the subsplit channel. The RT transmits the lower frequency telephone signal upstream through the subsplit channel. Thus, all active telephone electronics along the upstream signal path operate at lower frequencies resulting in reduced cost and power consumption.

As the signal travels upstream in the subsplit channel, each DU intercepts the entire telephony signal and selects out the data intended for one or more local subscribers, and transmits it down to the appropriate NIU. A coaxial cable hybrid circuit allows communication between the DU and NIU over the coaxial drop at the digital baseband frequency. Upon receipt of the data, the NIU reads it in and replaces it with outgoing data in a drop-and-insert fashion. The DU then places this data back into the same time slot of the data stream and rebroadcasts it upstream in the subsplit channel.

The use of the DUs at each tap location eliminates the ranging problem since each DU receives the entire digital signal from the feeder coaxial cable. This enables the use of synchronous transmission systems such as time division multiplexing. Since the return subsplit signal is repeated and the downstream video signal is less attenuated by each DU, the system requires fewer amplifiers along the transmission channel compared to a conventional distribution approach.

The unique arrangement of the DDL system of the present invention uses a routing bridger amplifier to manage the signal traffic. A routing bridger is employed at the intersection of several branches or legs of the network. The valid time slots are different for the signals arriving at the bridger from its different legs. The routing bridger includes circuitry to determine which time slots are valid from each leg, to recompose the returned signal into a fresh frame, and to transmit the signal back to the optic/electric node or other signal source.

Because this deployment approach requires some of the electronics to be placed in relatively small subsystems located outdoors, the present invention is preferably designed using very secure and flexible environmental protection for all system components.

Accordingly, in one embodiment, the present invention provides a distributed digital loop (DDL) carrier system on coaxial cable, the coaxial cable having a bandwidth divided into a high frequency downstream channel and a low frequency subsplit channel. The DDL carrier system includes a routing terminator located at an end of the high frequency downstream channel for receipt of unprocessed downstream high frequency telephone signal and for converting the high frequency telephone signal into low frequency subsplit signal, and for transmitting the telephone signal up through the low frequency subsplit channel. The DDL carrier system further includes a number of passive/active taps coupled to the coaxial cable, each tap having a passive access device and an active distribution unit. Each distribution unit is coupled to one or more network interface units via coaxial drop cables. Each network interface unit is located in the vicinity of a subscriber location and provides for subscriber interface to the DDL carrier system.

A better understanding of the nature and advantages of the DDL on coax system of the present invention may be had by referring to the diagrams and detailed description below.

DESCRIPTION OF SPECIFIC EMBODIMENTS

Figure 1:
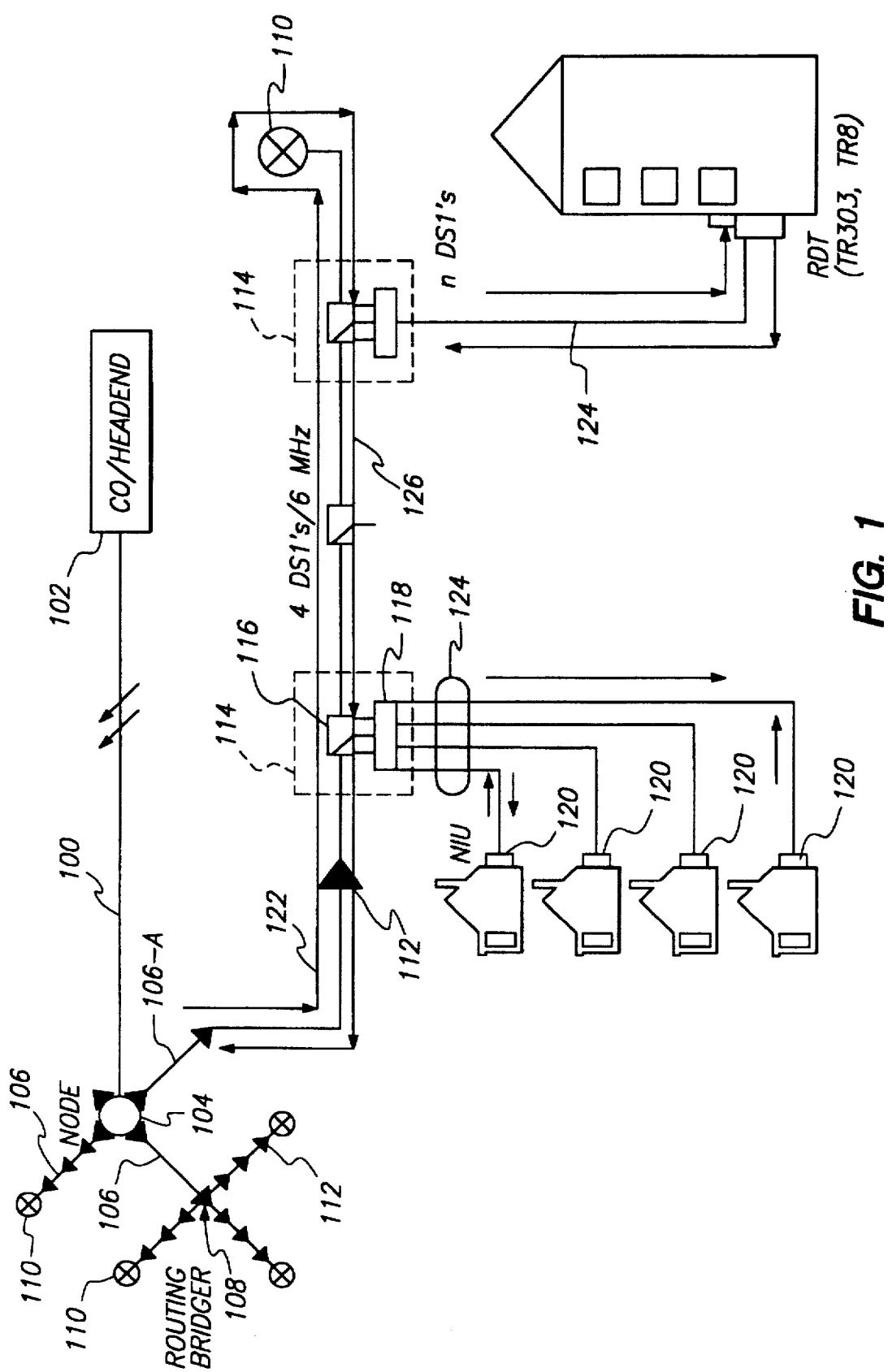
FIG. 1 is a top level diagram of the distributed digital loop (DDL) carrier system according to the present invention.

FIG. 1 is a top level diagram illustrating the overall architecture of the distributed digital loop (DDL) carrier system of the present invention. A main fiber optical feeder cable 100 connects a central office (or head end) 102 to an optic/electric node 104. The optic/electric node 104 provides for optical to electrical (and electrical to optical) conversion and broadcasts the electrical signal throughout the system via coaxial cables 106. A routing bridger 108 allows the branching of a single cable into several, for example three, legs. Each leg includes numerous amplifiers 112 that provide for signal amplification in both directions. A routing terminator (RT) 110 terminates each leg of the network.

FIG. 1 further shows components of the system along one branch 106-A of the network. Passive/active taps 114 are provided along branch 106-A to provide for subscriber access to the signal. Amplifiers 112 are placed between every few taps 114 to amplify the signal as it travels along the cable. Each tap 114 includes an in-cable passive device 116 and a detachable active device or distribution unit (DU) 118. The DU 118 connects via separate cables such as coaxial or other types of drop cables 124 to several (in this example four) different network interface units (NIUs) 120 that are located at the subscriber premises.

In operation, the frequency spectrum of the coaxial cable is conventionally divided at around 50 MHz to separate the downstream or supersplit channel 122 (50 MHz to 1000 MHz) from the upstream or subsplit channel 126 (5 MHz to 50 MHz). Voice telephone signals can be simultaneously transmitted downstream in any frequency channel that is unused by the CATV signals. In this exemplary embodiment, four DS1's (i.e., 96 voice channels using the North American standards) inside a 6 MHz band at around 700 MHz facilitate transmission of voice telephone signals in the downstream direction.

The downstream channel 122 thus carries both the high frequency video and telephone signals. As the signal travels down the channel 122, a directional coupler inside each tap 114 slices a portion, for example ⅓ of the signal (approximately 10 dB down from the total energy), of the video signal and transmits it down to the NIUs 120 via drop cables 124. The high frequency, broadband modulated telephone signal, however, passes through each tap 114 without further processing until it reaches the RT 110.

The RT 110 demodulates the analog voice telephone signal to baseband digital signal and regenerates the digital signal to eliminate accumulated noise. The RT 110 then remodulates the signal using a lower frequency (e.g., 18 or 20 MHz) suitable for the subsplit channel as the carrier frequency, and transmits it upstream through the subsplit channel 126. As the telephone signal travels up the subsplit channel 126, a diplexer inside each tap 114 diverts the telephone signal to the active circuitry of the DU 118. The DU 118 first demodulates the signal and selects the right DS1 for the attached subscribers. Then, the DU 118 converts the signal into a baseband signal by performing, for example, simple line coding techniques. Because of the short distances, simple line coding techniques such as Manchester coding or alternate mark inversion (AMI) can be used effectively.

The DU 118 then combines the baseband signal with DC power and downstream video signal and transmits the combined signal down through the first drop cable 124 to the first NIU 120. Upon receipt of the signal, the NIU 120 unloads and loads its channel(s) (voice time slots) also using line coding, and then passes the signal back up the drop using a hybrid circuit for coaxial cables. The DU 114 amplifies and remodulates the signal again and transmits it back down to the next NIU 120 on another drop cable 124. This process continues until all (in this example four) attached NIUs 120 have been passed.

Thus, the processing of the telephone signal is performed at the lower subsplit frequencies. The operation of the various components of the DDL system of the present invention will be described hereinafter in greater detail.

Tap Module: Passive Coupler

Figure 2B:
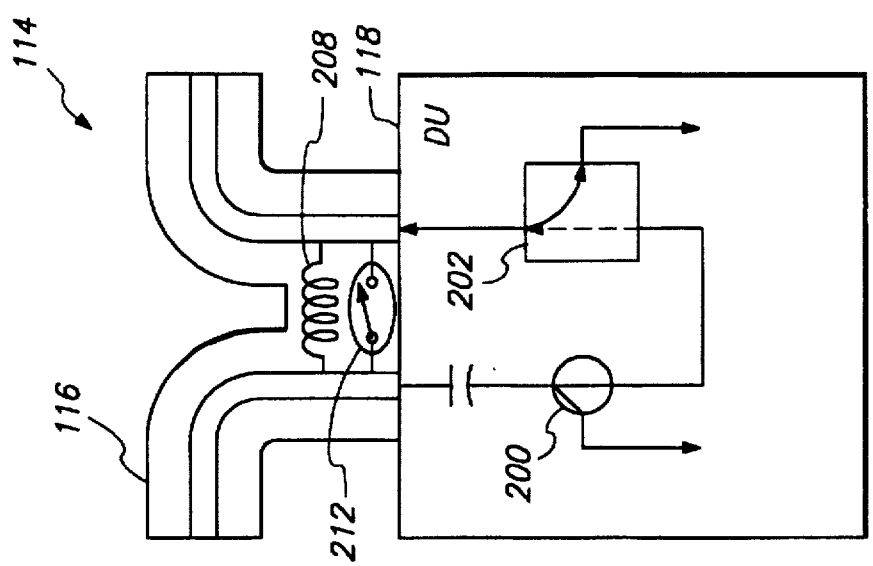
FIGS. 2A and 2B show two different embodiments for a passive/active tap for use in the DDL system of the present invention.
Figure 2A:
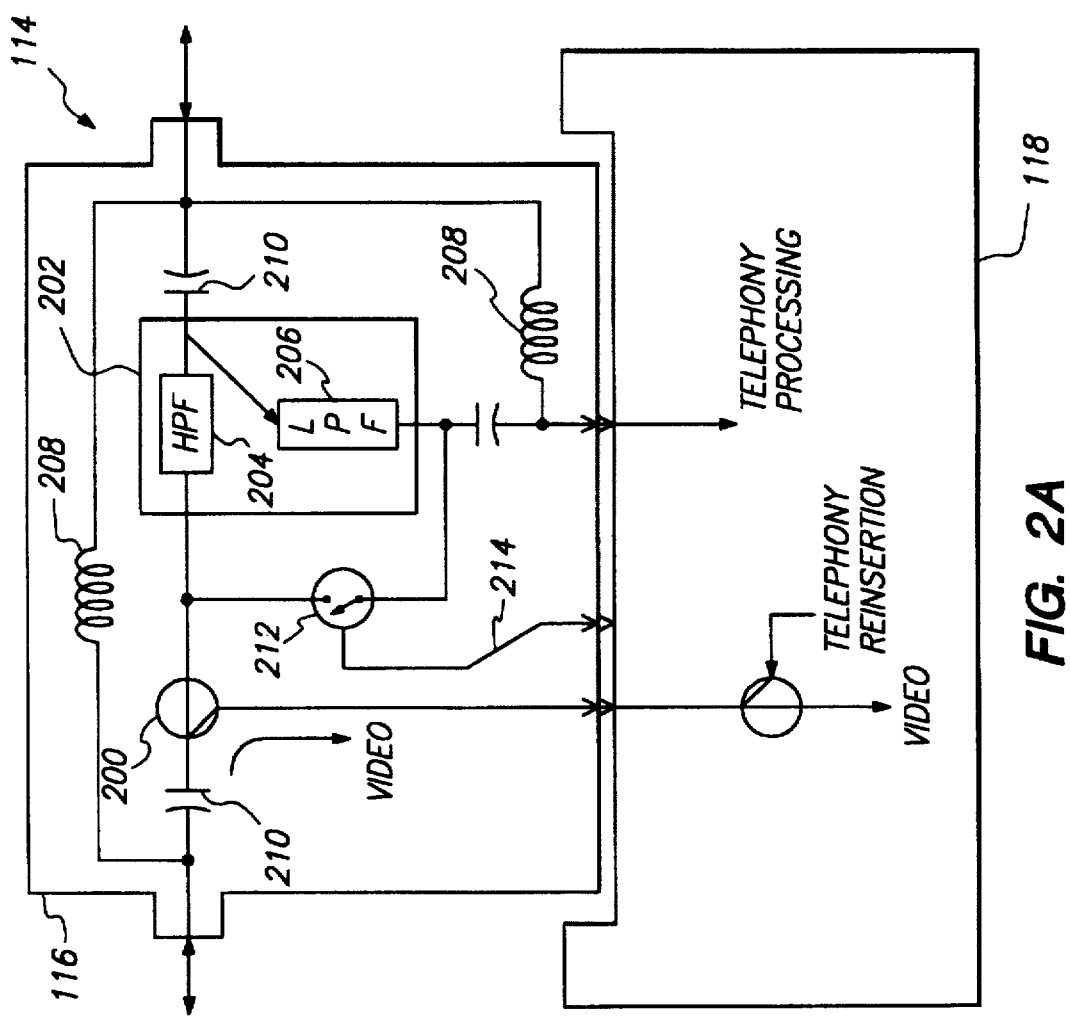

FIG. 2A shows one embodiment of the passive/active tap module 114 developed for the DDL system of the present invention. The tap module 114 includes the passive coupler 116 that is inserted into the coaxial cable, and the DU 118 that is attached to the passive coupler 116. The two main components of the passive coupler 116 are a directional coupler 200 and a diplexer 202. The directional coupler 200 is a transformer-based splitter that splits off a signal between 10 and 15 dB down from the total energy of the signal containing the video signals and directs it down toward the DU 118. The remaining portion of the video signal, as well as the high frequency telephone signal, continue to travel downstream (from left to right in FIG. 2A). The diplexer 202 includes a high pass filter 204 in the downstream direction to pass through the high frequency signal, and a low pass filter 206 in the upstream direction that filters out the low frequency subsplit signal and directs it toward the DU 118. To allow the 60 Hz power to pass through the tap and to the DU 118 undisturbed, inductors 208 are provided in both directions. Because both the directional coupler 200 and the diplexer 202 require coils of very fine wire, capacitors 210 are provided to protect these devices from potential damage caused by low frequency currents that tend to be large in magnitude. The passive coupler 116 inserts a small and predictable amount of loss of approximately 1 dB in the signal path.

The particular passive coupler 116 shown in FIG. 2 provides a bypass mechanism that ensures continuous flow of upstream signal along the coaxial distribution cable even when the DU 118 is detached. A bypass switch 212 is connected across the diplexer 202, coupling the output of the low pass filter 206 to the downstream input of the diplexer 202. The bypass switch 212 is activated upon detaching the DU 118 from the passive coupler 116. Without the bypass switch 212, when the DU 118 is removed, the upstream signal is diverted away from the main cable without any return path. The present invention, however, allows the upstream signal to flow through the tap relatively undisturbed when the DU 118 is detached for repair, maintenance, or upgrading purposes. Another embodiment connects the bypass switch 212 across the output of the high pass filter 204 and the downstream input of the diplexer 202. This accomplishes a similar bypassing of the DU 118 for the upstream signal. The bypass switch 212 is preferably implemented using a diode switch that is activated by a contact signal 214. However, an electromechanical relay using magnetic elements, or a mechanically activated switch can also be used to implement the bypass switch 212.

FIG. 2B shows a second embodiment of the passive/ active tap module 114. In this embodiment, the passive element 116 only includes a single inductor 208 for passing the 60 Hz power signal through, and the bypassing switch 212, both connected across the tap to bypass the DU 118. The directional coupler 200 and diplexer 202 are placed inside the DU 118. Again, the bypassing function may be implemented using electronic or mechanical devices.

Routing Terminator

Figure 3:
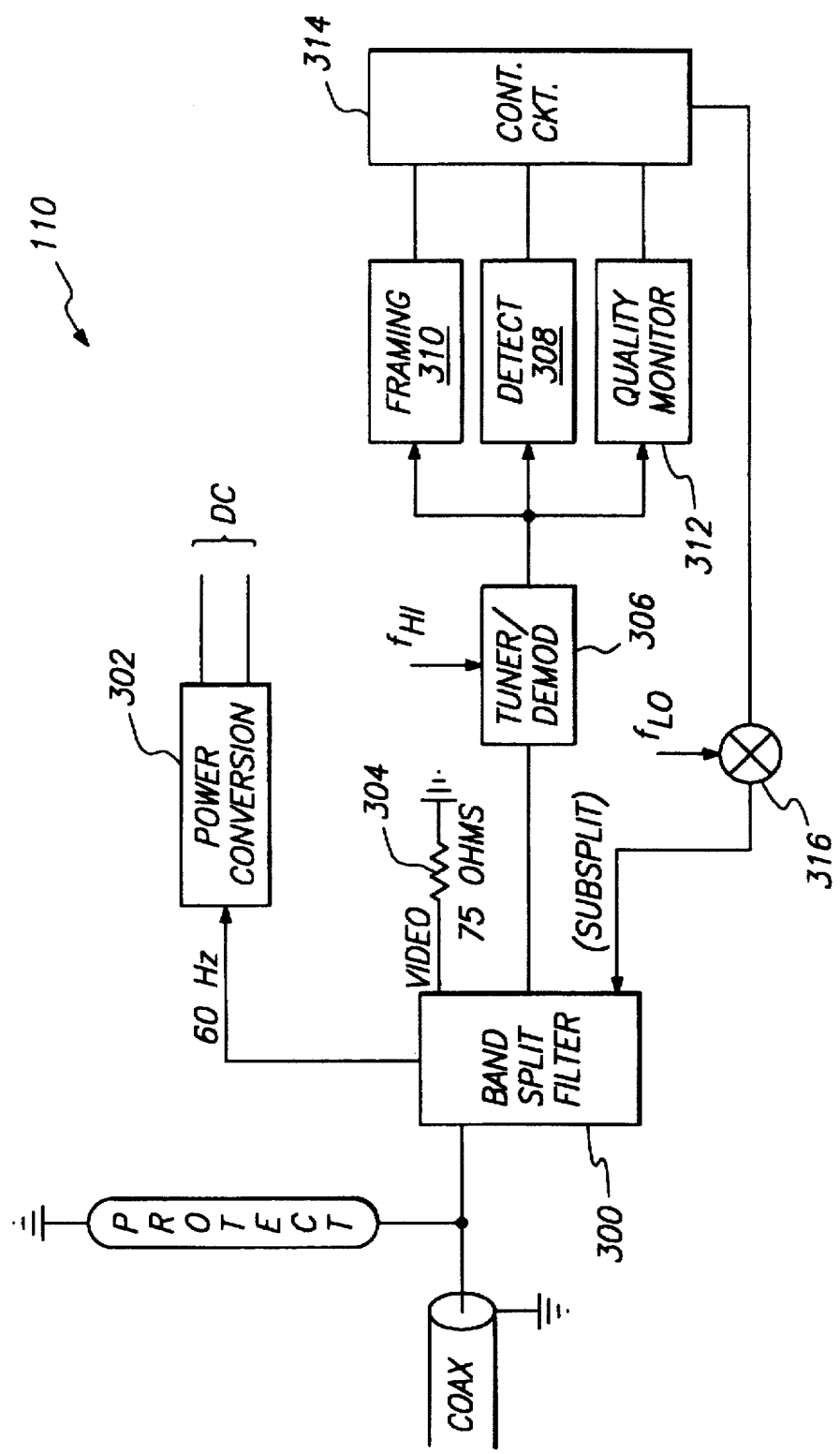
FIG. 3 is a block diagram for a routing terminator used in the DDL system of the present invention.

FIG. 3 shows a block diagram of a preferred embodiment of the routing terminator (RT) 110 used in the DDL system of the present invention. The main function of the RT 110 is to convert the high frequency downstream telephone signal to lower frequency suitable for transmission in the subsplit channel 126. However, the RT 110 as shown in FIG. 3 includes additional circuitry for noise reduction.

The RT 110 includes a band split filter 300 that receives the downstream signal from the coaxial cable. The band split filter 300 extracts the 60 Hz power signal from the downstream signal and applies it to a power conversion circuit 302 to obtain DC power. The band split filter 300 combines the received high frequency downstream signal and the transmitted low frequency subsplit signal on the coaxial cable. The band split filter 300 may perform other functions such as error checking and sending alarm signals. The band split filter 300 further includes a video signal termination resistor 304 of approximately 75 Ω to reduce video signal reflection.

The filtered high frequency downstream signal is applied to a tuner/demodulator 306 that is programmed to tune in the specific frequency of the telephone signal, which in this example is set at around 700 MHz. The demodulator demodulates the signal to baseband using one or more stages of demodulation. The digital signal is applied to a detect circuit 308, a framing circuit 310 and a quality monitor circuit 312. The detect circuit 308 detects the four downstream DS1 signals, while the framing circuit 310 extracts the framing information for each signal. The quality monitor circuit 312 monitors the bit error rate and the signal eye pattern to determine signal quality. The outputs of these three circuits feed into a control circuit 314 that reshapes and repeats the digital signal to remove noise and restore signal quality. The output of the control circuit 314 goes through a modulator 316 that modulates the digital signal using a subsplit frequency of, for example 18 MHz, as the carrier frequency. The modulated subsplit signal is then applied to an input of the band split filter 300 to be placed back on the coaxial cable. Thus, the RT 110 converts the high frequency telephone signal to a low frequency signal and maximizes the available signal to noise ratio. This signal is then transmitted upstream and intercepted by the first DU 118.

Figure 4:
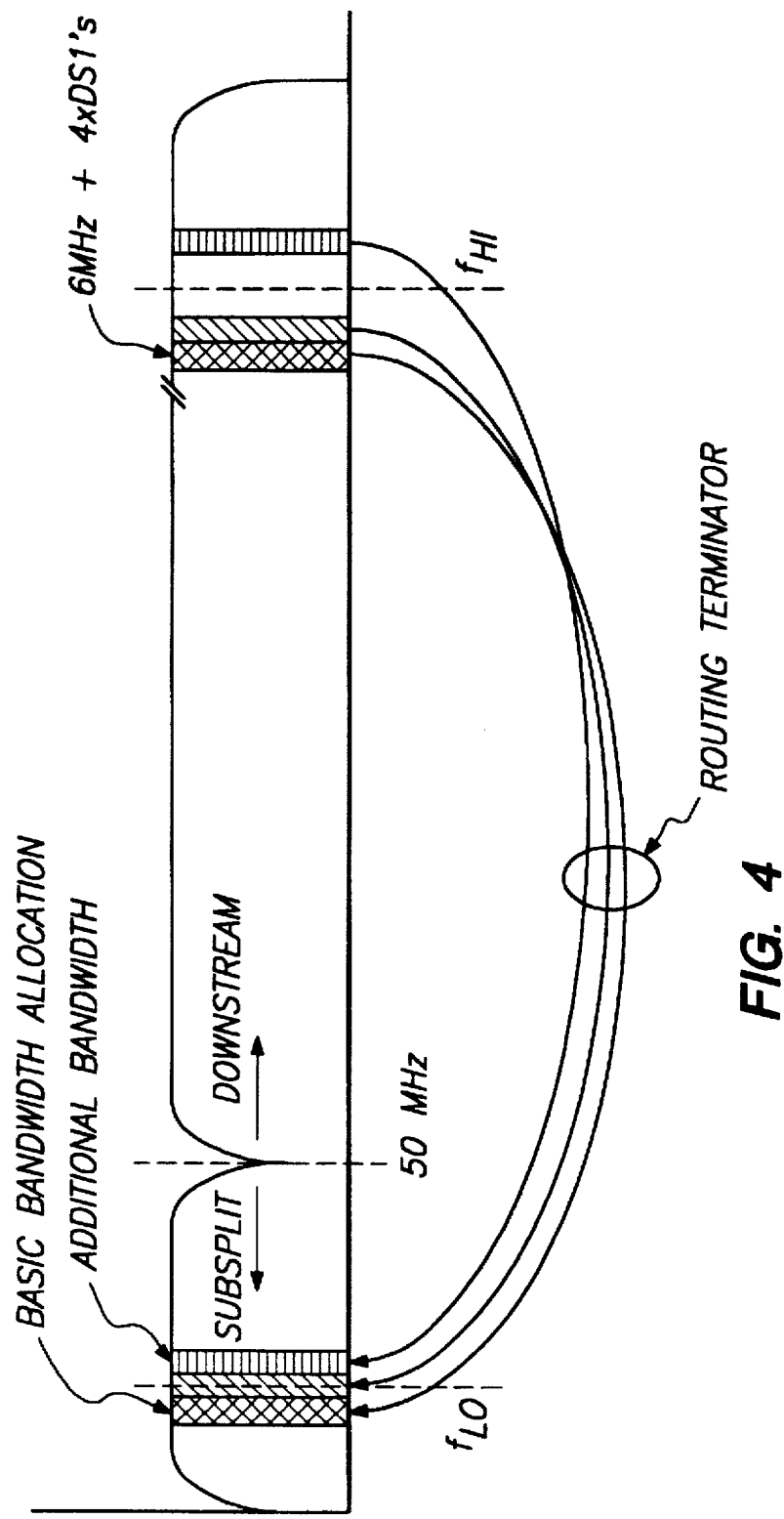
FIG. 4 illustrates management of the coaxial cable frequency spectrum according to the present invention.

FIG. 4 illustrates the spectral management of the DDL system of the present invention. The 50 MHz frequency marks the separation between the downstream and the subsplit. Telephone signals are transmitted downstream within several 6 MHz frequency bands each carrying, for example, four DS1s. These signals are transmitted at around for example 700 MHz, a frequency typically unused for video transmission. The RT 110 shifts the frequency of the downstream digital package (e.g., four DS1's) down to around, for example, 18 MHz within the subsplit channel as shown. The subsplit is also used by video management signals which must be assigned outside the band of frequencies used for the telephone signal.

Tap Module: Distribution Unit

Figure 5A:
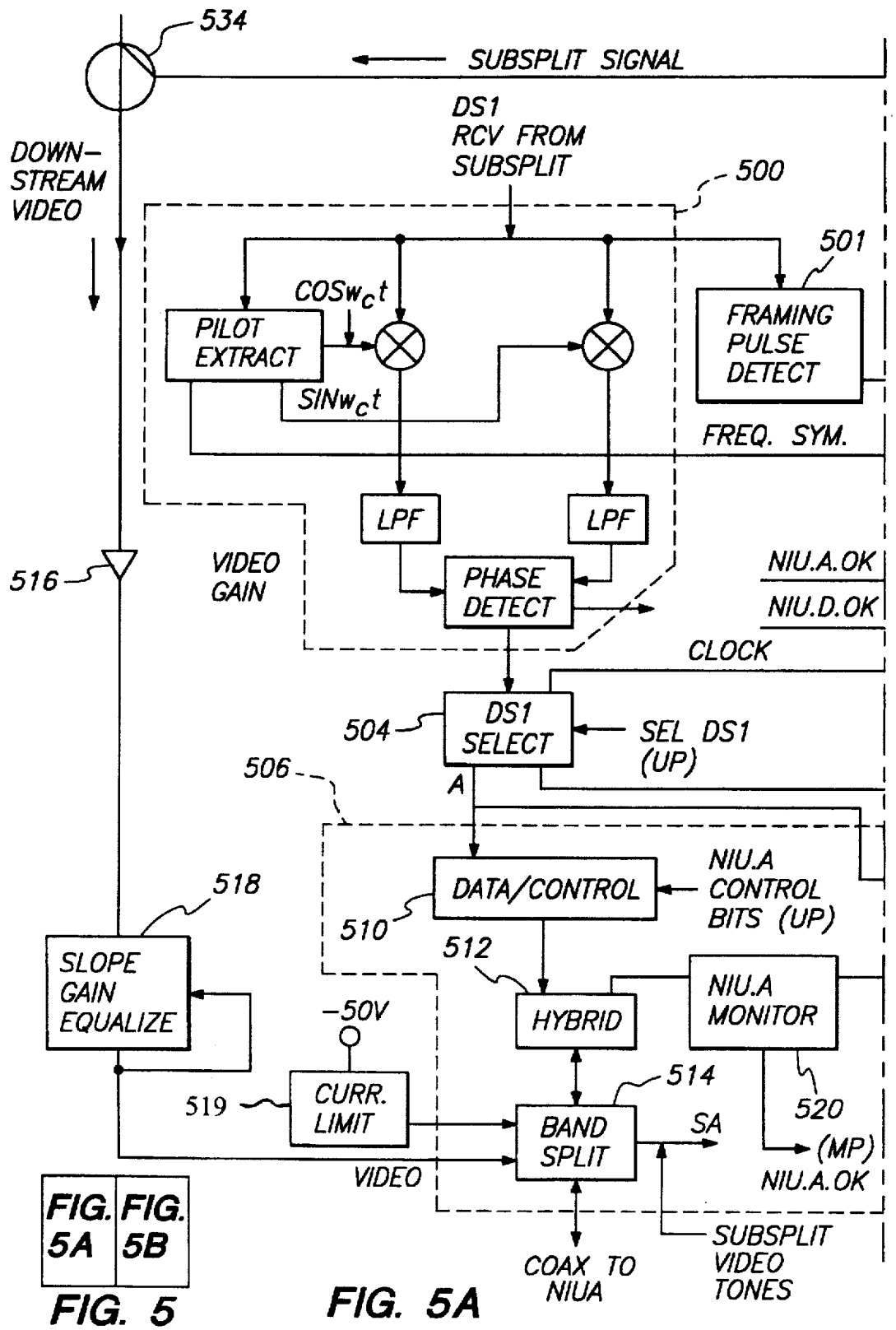
FIG. 5 is a block diagram of a distribution unit for use in the passive/active tap of the present invention.
Figure 5B:
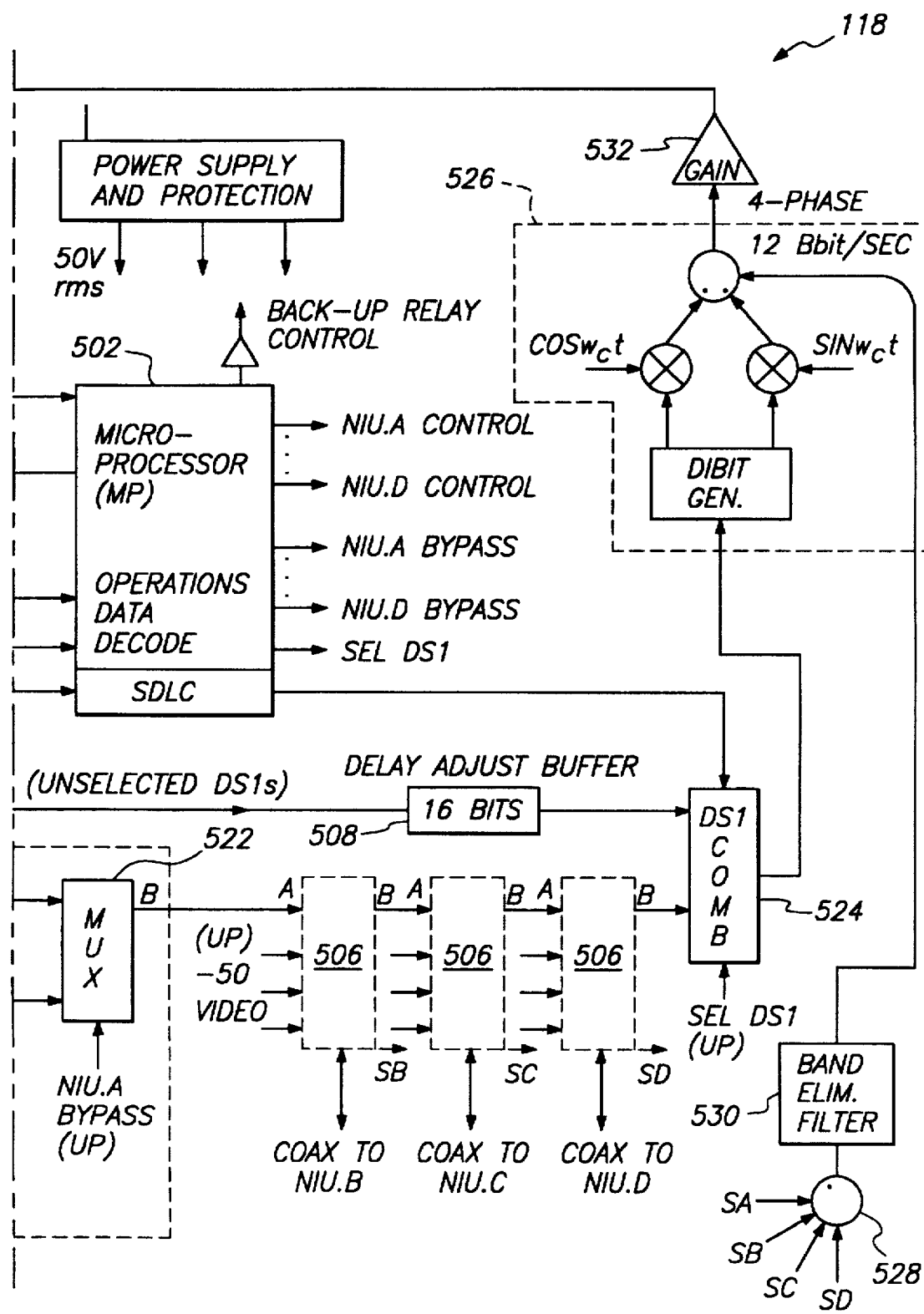

The high frequency downstream telephone signal travels the entire length of the cable through numerous taps without being intercepted. Once converted to low frequency and transmitted up the subsplit channel, however, the signal is diverted by the diplexer 202 in each tap 114 (FIG. 2A) to the DU 118. FIG. 5 shows the block diagram for the DU 118 as used in the embodiment for the tap module 114 shown in FIG. 2A. Two separate signals are supplied to the DU 118: the high frequency downstream video signal from the directional coupler 200, and the subsplit DS1 signal from the diplexer 202. The subsplit DS1 is first demodulated by a demodulator 500 that also extracts the clock signal for synchronous operation. To save expensive framer devices, in one embodiment, the signal formatter/modulator used at the source of the DDL system of the present invention reformats the framing pulse of each DS1 into a specially recognizable data pulse by simply making it larger than normal data pulses. This reformatted large framing pulse is easily detected by a framing pulse detect block 501 inside the DU 118.

A microprocessor 502 receives the DS1 framing information and the extracted clock signal, while a DS1 select block 504 receives the demodulated DS1 signal. The microprocessor 502 receives, via a dedicated time slot, system control information from the central office 102 (FIG. 1). A SEL DS1 control signal is generated by the microprocessor 502 and, in response to assignment control information from the central office 102, is applied to DS1 select block 504 to select the particular DS1 intended for the local NIU. A first NIU signal processing block 506 receives the selected DS1, while the unselected DS1s are fed into a delay adjust buffer 508. The NIU signal processing block 506 selects the appropriate DS1 signal and routes it to the first NIU, NIU A. The DU 118 further includes three other essentially identical NIU signal processing blocks 506 that are serially connected to the first NIU signal processing block 506 to service four local NIUs, NIUA, NIUB, NIUC, and NIUD.

The NIU signal processing block 506 includes a data/control block 510 that combines the selected DS1 with NIU control bits for the attached NIU. The NIU control bits are provided by the microprocessor 502 that translates incoming configuration information into a special NIU set-up message consisting entirely of the special data pulse format (i.e., larger pulses). The combined signal then goes through a hybrid circuit 512 that in addition to performing the normal hybrid function, performs simple line coding on the DS1 signal (1.544 MHz in North America) to convert it down to baseband signal. The hybrid circuit 512 uses preferably Manchester coding, although other line coding techniques such as alternate mark inversion or HDB3 can also be used. The line coded combined DS1 and NIU control signal is applied to a band split filter 514 that combines the low frequency baseband telephone signal with the high frequency downstream video signal. The video signal from the directional coupler 200 is first amplified by an amplifier 516. The video signal then goes through a slope and gain equalizing circuit 518 and then applied to the band split filter 514. The combined signal is transmitted via the coaxial cable drop down to the first NIU or NIUA. A current limiting circuit 519 also connects to the band split filter 514 to limit the amount of current flowing through cables that are exposed to the subscribers. Note that since the DU 118 may optionally amplify both the video and the telephone signals going to the subscriber, the tap ratios of all tap modules can be made the same. This simplifies the network design and reduces the number of amplifiers that are required along the cable.

The return subsplit signal from the NIU includes telephone signal as well as subsplit video tones. The band split filter 514 receives the return signal and separates the subsplit video tones at an output SA. The band split filter also helps remove most of the upstream interfering signal ingress and improves reliability and quality of the telephony subsystem. The return telephone signal goes back through the hybrid circuit 512, which separates the transmit and receive signals, and is applied to an NIU monitor logic 520. The NIU monitor logic 520 checks the functionality of the attached NIU by monitoring the number and location of the time slots allocated to that NIU. An output signal NIUAOK indicates whether the attached NIUA is functional. This signal is applied to the microprocessor 502 which generates an NIU ABYPASS signal in response. The NIUABYPASS signal is applied as a control signal to a multiplexer 522. The two inputs to the multiplexer 522 are the return telephone signal at the output of the NIU monitor logic 520, and the output of the DS1 select block 504. Thus, when NIU monitor logic 520 determines that the attached NIUA is faulty, NIUA BYPASS is asserted, and the selected DS1 is coupled to the output of the multiplexer bypassing the first NIUA.

The selected DS1 continues to travel through the remaining NIU signal processing blocks 506 in a serial fashion, servicing all attached NIUs. The signal is then recombined with the delay adjusted unselected DS1s by a DS1 combine block 524. The DS1 combine block 524 uses the extracted clock information and the SELDS1 signal from the microprocessor 502 to form the complete upstream DS1 signal at its output. The upstream DS1 signal is combined with the subsplit video signal received from the local NIUs, and modulated by modulator 526. The video subsplit signals SA, SB, SC, and SD are first added by an adder circuit 528, then pass through a band eliminate filter 530, and applied to the modulator 526. The band eliminate filter 530 removes any extraneous signal energy that would interfere with the modulated telephone signal. The subsplit signal at the output of the modulator 526 is amplified by an amplifier 532 and then reinserted into the coaxial distribution cable via a directional coupler 534. The addition of a modest net gain to the subsplit signal eliminates the need for separate upstream amplifiers along the cable.

Network Interface Unit

Figure 6:
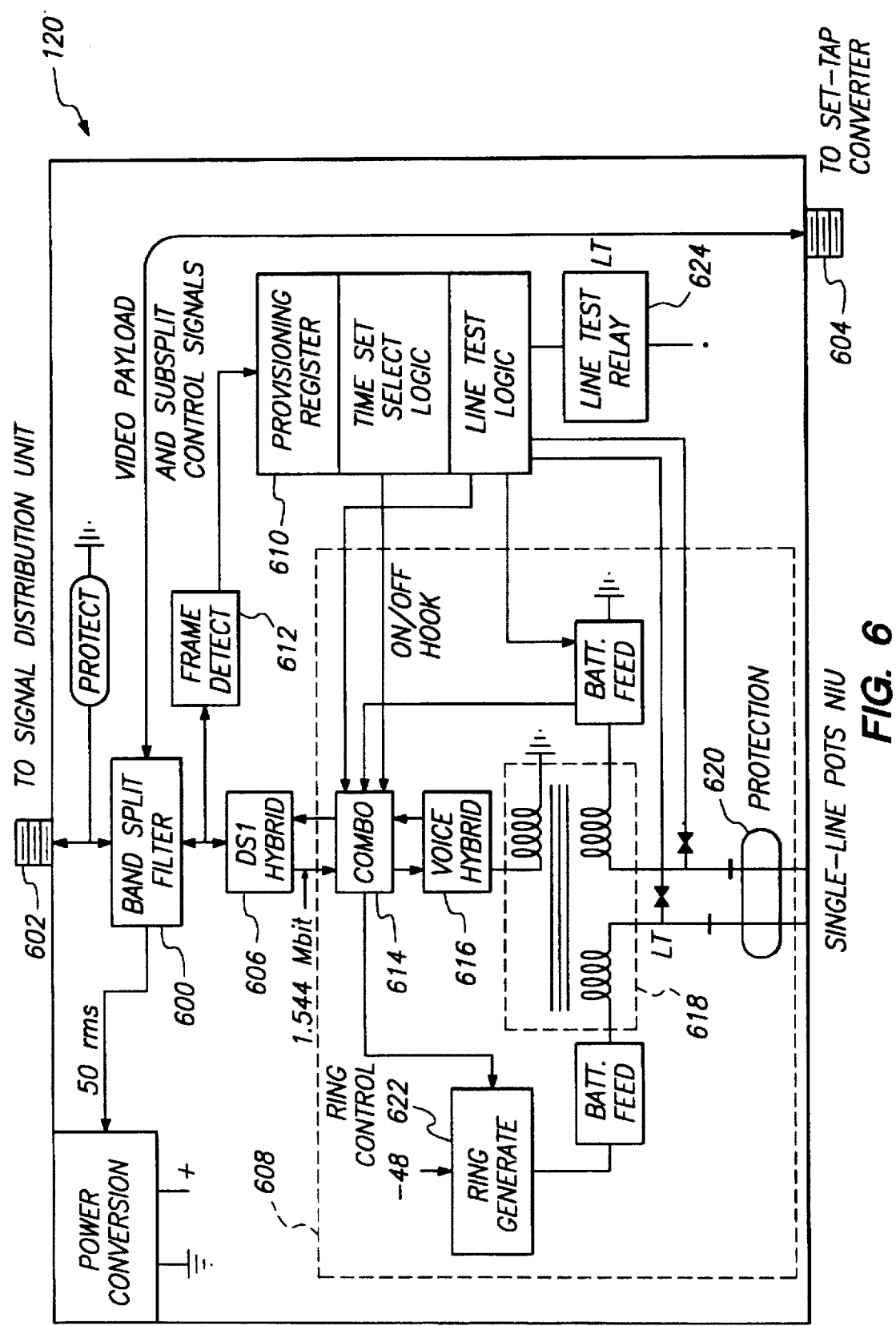
FIG. 6 is a block diagram of a network interface unit for use in the DDL system of the present invention.

FIG. 6 is a block diagram of the single-line NIU 120 used in the DDL system of the present invention. The NIU 120 includes a band split filter 600 whose input terminal couples to the coaxial drop cable connector 602. The band split filter 600 filters out the downstream video signal and directs it to the video coax connector 604 that is connected to the television set-top converter by the subscriber. The filtered DS1 signal is fed to a special DS1 hybrid circuit 606 that manages the two-way traffic between the transmit and receive signals.

The hybrid circuit 606 is capable of transmitting signals in both directions on the same baseband frequency. This is accomplished by transmitting and receiving (across an impedance) at both ends of the drop cable at the same time. At each end circuits read the total signal on the line and then subtract the signal being transmitted from the same end. This type of circuit is commonly used in the transmission of duplex signals on a single twisted pair but is not ordinarily used on coaxial cables. Because in the system of the present invention active electronics are provided at both ends of the drop cable 602, this power efficient hybriding function can be employed by the NIU 120. The DS1 hybrid circuit 606 also decodes the line coded signal to recover the DS1 signal before applying it to a line circuit 608.

The line circuit 608 includes a standard "combo" filter-codec device 614 which converts the selected channel (DS0) of the DS1 signal into a voice band signal. The voice band signal is then coupled to subscriber tip and ring wires via a conventional hybrid circuit 616 and transformer 618. The line circuit 608 further includes battery feed for the transformer 618, protection circuitry 620 coupled to the tip and ring terminals, and a low-power DC to AC ring generator 622.

The NIU also includes a provisioning circuit 610 which receives the time slot assignment(s) for the attached subscriber from a frame detect circuit 612. The provisioning circuit 610 includes a configuration register which stores time slot allocations, testing and other command bits for the NIU. The registered time slot assignments for the NIUs are previously remotely configured via a block of data consisting of the special (i.e., large) pulses following a framing pulse. The provisioning circuit 610 further includes time slot select logic and line test logic that communicate with the combo device 614 and line test relay 624.

The outgoing speech is coded by the combo device 614 and placed in the same time slot as that of the received DS1 signal. The DS1 hybrid 606 inserts the contents of the NIU configuration register in place of the new control bits for the outgoing signal to allow for NIU monitoring by NIU monitor logic 520 in the DU 118 (FIG. 5). The outgoing signal is then combined with subsplit video control signals by the band split filter 600 and returned to the DU 118 via the same coax drop as the arriving signal.

The interface to the DDL system of the present invention is not limited to the single-line POTS embodiment of the NIU described above. The NIU can be, for example, any one of a basic POTS interface device, SLC-96 socket emulator for provision of special services, ISDN interface device, or DS0 or DS1 extender. The only requirements for any type of NIU used in the DDL system are the interface to the serving coax drop cable, and the drop-and-insert method by which receive and transmit signals are processed.

Routing Bridger

Referring back to FIG. 1, the routing bridger 108 receives the downstream RF signal from the optic/electric node 104 and broadcasts it to several legs. As discussed above, the routing terminator 110 in each leg repeats and translates the voice bundle into its subsplit allocation and sends it back upstream. As the upstream signal travels along the subsplit, various time slots in the voice bundle are replaced by the DU/NIU elements on each leg. Thus, the signal arriving at the routing bridger 108 is different for each leg, with different time slots being valid from each leg. The routing bridger 108, therefore, must be capable of determining which time slots are valid from each leg to properly steer the time slots in the return direction. To accomplish this task, the routing bridger 108 takes advantage of the fact that messages from the head end to peripheral devices (e.g., DUs and NIUs) are acknowledged as executed or received. The DDL system of the present invention employs the synchronous data link control (SDLC) protocol for data communications. SDLC is based on a zero-bit-insertion algorithm, similar to CCITT's high level data link control (HDLC), except it contains a special poll flag for loop operation. The poll flag is sent out by the head end via the SDLC common data channel to the peripheral devices. The peripheral devices confirm the receipt of a message by modifying the poll flag. Thus, by decoding the data channel between the head end and the peripheral devices and examining the poll flag, the routing bridger 108 can identify the valid time slots from each leg.

Figure 7:
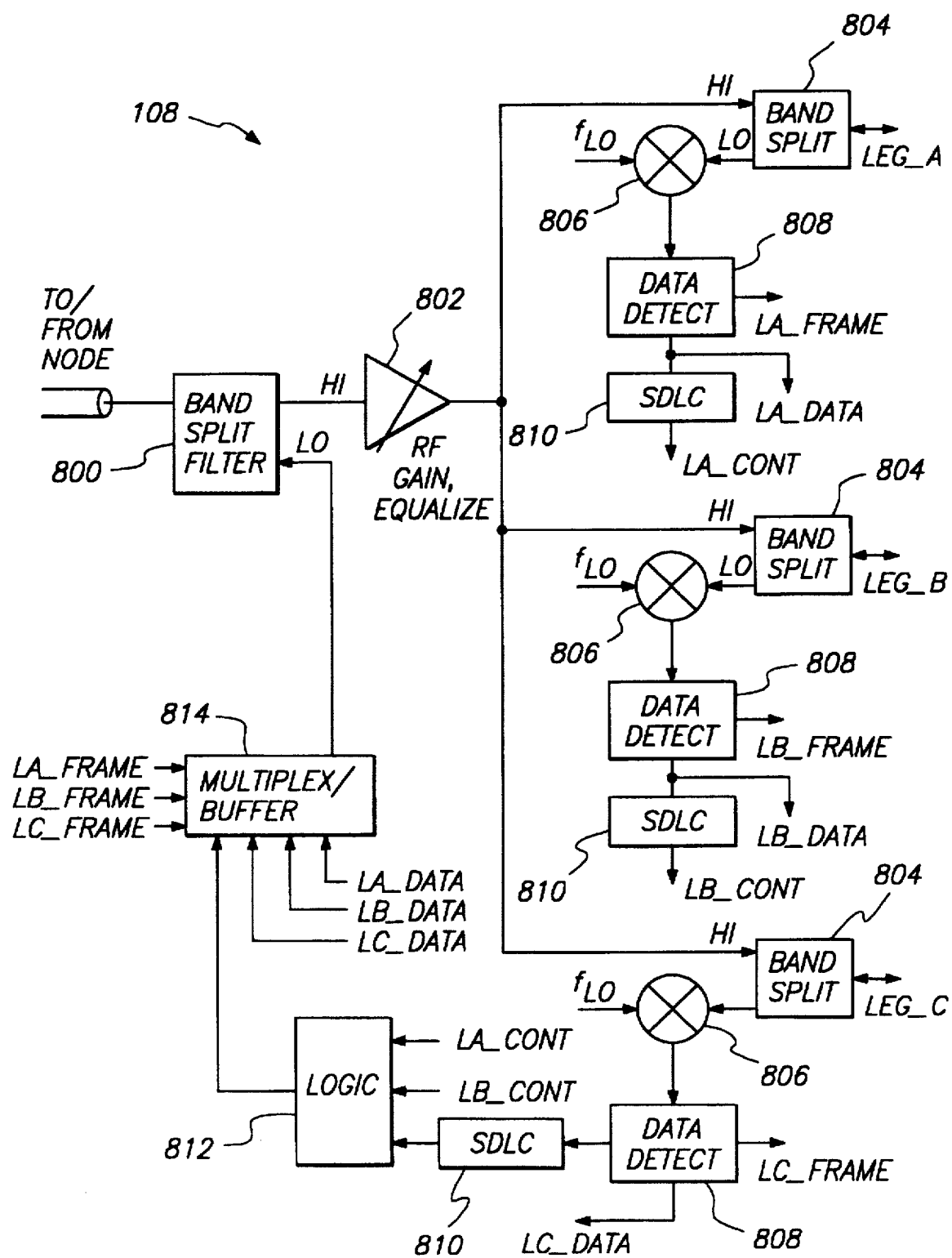
FIG. 7 is a block diagram for a routing bridger amplifier used in the DDL system of the present invention.

FIG. 7 is a diagram of one embodiment of the routing bridger 108 used in the DDL system of the present invention. The downstream signal received on the coax cable connecting the routing bridger 108 to the optic/electric node 104 is applied to a bandsplit filter 800. The high frequency downstream signal at the output of the bandsplit filter 800 is amplified and equalized by amplifier/equalizer 802. The signal is then simultaneously applied to inputs of three bandsplit filters 804, each coupled to a separate leg. The high frequency RF signal is thus broadcast to all legs of the network connected to the routing bridger 108.

The return subsplit signal from each leg is separated from the high frequency downstream signal by bandsplit filters 804. The subsplit signal from each leg is separately decoded by decoders 806. The decoded signal is applied to a data detect block 808 which detects the framing information (LA FRAME, LBFRAME, and LCFRAME) and data (LA DATA, LBDATA, and LCDATA) for the signal in each leg. The detected data is then applied to an SDLC block 810 which examines the SDLC data and generates a control signal (LACONT, LBCONT or LCCONT). The control signals are then applied to abridger control logic 812. A multiplexer/buffer 814 receives the framing and data information from each leg, as well as the output of the control logic 812. Based on the SDLC control signals, the multiplexer/buffer 814 recomposes the return subsplit signals into a fresh frame. Thus, when a DU 118 agrees to use time slot X for one of its NIUs, the routing bridger 108 can instantly allocate this time slot to whichever leg the message appeared on.

In conclusion, the present invention provides a low power, low cost, highly efficient distributed digital loop carrier system that combines television and voice telephone signal transmission over coaxial cables. The DDL system of the present invention offers a number of advantages over the existing CATV systems. The DDL system translates the high speed downstream telephone signal to low frequency subsplit signal before processing it. The system thus separates the sensitive high speed feeder network from a robust local low frequency digital network with a wall of filters and repeaters to maximize signal to noise ratio. The use of a unique passive/active tap, allows the DDL system of the present invention to share the low frequency electronics by several subscribers, saving power, parts and cost. The passive/active taps permit the rearrangement of the subscriber services without interrupting downstream or upstream services. The DDL system allows use of the more efficient synchronous data transmission systems (e.g., TDM) by eliminating ranging problems. The system further reduces cost by reducing the number of line amplifiers required and simplifies the tapping of the feeder by allowing all taps to have the same ratio and therefore the same insertion loss. The DDL system provides an error checking facility for the digital data flowing up and down stream for automatic fault location.

While the above is a complete description of the preferred embodiments of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. A distributed digital loop (DDL) system providing video and telephone services to a plurality of subscribers, comprising:

a plurality of taps placed at intervals along a coaxial cable carrying video and telephone signals, each one of said plurality of taps having a passive module coupled to an active distribution unit;

a routing terminator coupled at an end of said coaxial cable; and a network interface unit located at a subscriber premises, said network interface unit coupling subscriber video and telephone equipment to said active distribution unit via a drop cable, wherein, telephone signals travelling down toward said routing terminator pass through said plurality of taps, and are converted into low frequency telephone signals by said routing terminator for transmission back to said plurality of taps in a subsplit frequency channel of said coaxial cable.

2. The DDL system of claim 1 wherein said passive module comprises a bypassing circuit being activated to create a continuous signal path along said coaxial cable when said active distribution unit is decoupled from said passive module.

3. The DDL system of claim 2 wherein said passive module further comprises:

a directional coupler for extracting a portion of signals travelling toward said routing terminator and diverting said extracted portion to said active distribution unit; and a diplexer for extracting said low frequency telephone signals travelling in said subsplit frequency channel and diverting said extracted low frequency telephone signals to said active distribution unit.

4. The DDL system of claim 3 wherein said active distribution unit comprises:

a demodulator having an input coupled to said diplexer for receipt of said low frequency telephone signal;

a selection circuit having an input coupled to an output of said demodulator, said selection circuit selecting a predefined portion of said low frequency telephone signals at an output;

a video signal amplifier, having an input coupled to said directional coupler for receipt of said portion of video signals, said amplifier for generating amplified video signals; and a filter circuit having a first input coupled to an output of said video signal amplifier and a second input coupled to said output of said selection circuit, wherein, said filter circuit combines said amplified video signals and said predefined portion of said low frequency telephone signals onto said drop cable.

5. The DDL system of claim 4 wherein said network interface unit comprises:

a bandsplit filter having a terminal coupled to said drop cable, said bandsplit filter separating said video signals from said predefined portion of said low frequency telephone signals; and means, coupled to said bandsplit filter, for transmitting said telephone signals to a subscriber telephone, and inserting new telephone signals received from said subscriber telephone in place of said telephone signals, wherein, said bandsplit filter combines said new telephone signals received from said subscriber telephone with video control signals generated by subscriber video equipment to generate a combined subsplit signal, and transmits said combined subsplit signal to said distribution unit through said drop cable.

6. The DDL system of claim 5 wherein said network interface unit further comprises a hybrid circuit to control receipt of said telephone signals being transmitted to a subscriber telephone and transmission of said new telephone signals received from said subscriber telephone, on said drop cable.

7. The DDL system of claim 5 wherein said active distribution unit further comprises:
   a time slot monitoring circuit having an input coupled to said drop cable, said monitoring circuit testing a functionality of said network interface unit by examining the integrity of said combined subsplit signal;
   a bypass circuit having a first input coupled to an output of said monitoring circuit and a second input coupled to said output of said selection circuit, said bypass circuit bypassing a connection to said network interface unit if said network interface unit is malfunctioning;
   a modulator having an input coupled to receive said combined subsplit signal; and
   a subsplit amplifier coupled at an output of said modulator for amplifying and transmitting said combined subsplit signal onto said coaxial cable.

8. The DDL system of claim 1 wherein said routing terminator comprises:
   a filter circuit having an input adapted to receive said telephone signals travelling down toward said routing terminator;
   a demodulator/repeater coupled to said filter circuit, said demodulator/repeater demodulating and repeating said telephone signals to generate a digital signal having a larger signal to noise ratio; and
   a modulator coupled to an output of said demodulator/repeater,
   wherein, said modulator converts said digital signal to said low frequency telephone signals by remodulating said digital signal with a carrier frequency suitable for said subsplit frequency channel.

9. The DDL system of claim 1 wherein data is transmitted using a synchronous data transmission format.

10. A distributed digital loop (DDL) carrier system for transmission of video and telephone signals, the system having a central office coupled to a plurality of coaxial cables, the DDL system comprising:
    a plurality of passive taps placed at intervals along each of the plurality of coaxial cables;
    a plurality of routing terminators each coupled to an end of each of the coaxial cables, each routing terminator converting the telephone signal from a high frequency signal to a low frequency telephone signal for transmission in a subsplit frequency channel of the coaxial cable;
    a plurality of distribution units each one coupled to one of said plurality of passive taps, each distribution unit having active circuitry for processing said low frequency telephone signal; and
    a plurality of network interface units, each coupled to a distribution unit via a drop cable, and coupled to subscriber telephone and video equipment.

11. A signal tap apparatus for use on a coaxial cable comprising:
    a passive module insertable into said coaxial cable, said passive module comprising an inductor for passing a power signal through, and a switch for bypassing said passive module; and
    a detachable distribution unit coupled to said passive module, said detachable distribution unit comprising active circuitry.

12. The signal tap apparatus of claim 11 wherein when said distribution unit is detached from said passive module, said switch is activated allowing signals to bypass said passive module.

13. The signal tap apparatus of claim 12 wherein said passive module further comprises:
    a directional coupler for extracting a portion of a signal travelling in a first direction from a central office to a coaxial cable termination, and diverting said extracted portion to said distribution unit; and
    a diplexer for extracting telephone signals travelling in a second direction from said coaxial cable termination to said central office, and diverting said extracted telephone signals to said distribution unit.

14. The signal tap apparatus of claim 13 wherein said diplexer comprises:
    a high pass filter for passing high frequency telephone signals through said passive module in said first direction; and
    a low pass filter for diverting low frequency telephone signals in said second direction through to said distribution unit.

15. The signal tap apparatus of claim 12 wherein said distribution unit comprises:
    means for receiving a portion of video signals travelling in a first direction from a central office toward a coaxial cable termination;
    means for receiving telephone signals travelling in a second direction from said coaxial cable termination toward said central office; and
    means for combining said portion of video signals with a selected portion of said telephone signals to generate a to-subscriber signal.

16. The signal tap apparatus of claim 15 wherein said distribution unit further comprises:
    means for receiving a signal from a subscriber; and
    means for transmitting said signal from said subscriber through said coaxial cable.

17. The signal tap apparatus of claim 16 wherein said distribution unit further comprises:
    a subscriber monitoring circuit coupled to said means for receiving;
    a bypass circuit bypassing an attached subscriber in response to said subscriber monitoring circuit; and
    a microprocessor for controlling all active circuitry of said distribution unit.

18. A routing terminator coupled at an end of a coaxial cable comprising:
    a filter circuit having an input adapted to receive telephone signals travelling in a first direction from a central office toward the routing terminator;
    a demodulator/repeater circuit having an input coupled to an output of said filter circuit; and
    a modulator having an input coupled to an output of said demodulator/repeater,
    wherein, said demodulator/repeater generates a digital signal that is converted to lower frequency telephone signal by said modulator.

19. The routing terminator of claim 18 wherein said filter circuit comprises:
    a band split filter coupled to the end of the coaxial cable, for separating received video signals from received telephone signals, and for transmitting said lower frequency telephone signal onto the coaxial cable; and a resistive termination coupled to a video signal output of said band split filter.

20. A subscriber network interface unit comprising:

a band split filter coupled to a cable drop for receipt of a combined to-subscriber higher frequency video and lower frequency telephone signal, said band split filter separating a telephone portion from a video portion of said combined to-subscriber video/telephone signal;

a hybrid circuit for lower frequency telephone signals coupled to said band split filter; and a line circuit coupled between said hybrid circuit and subscriber telephone equipment.

21. The subscriber network interface unit of claim 20 wherein said band split filter forwards said video portion of said combined to-subscriber video/telephone signal to subscriber video equipment.

22. The subscriber network interface unit of claim 21 wherein said band split filter receives and combines from-subscriber telephone signals and video control signals, and transmits a combined from-subscriber telephone/video signal to said cable drop.

23. A routing bridger for use in a system providing combined video and telephone signals communication between a central office and a plurality of subscribers, said routing bridger comprising:

a feeder band split filter having an input/output terminal coupled to a single feeder coaxial cable, said feeder band split filter having a high frequency output and a low frequency input;

a plurality of branch band split filters coupled to a plurality of network branches, respectively, a high frequency input of each one of said plurality of branch band split filters coupled to said high frequency output of said feeder band split filter;

a plurality of data identifier blocks each one coupled to a low frequency output of each one of said plurality of branch band split filters, respectively, each data identifier block identifying timing information of a low frequency telephone signal received from a respective network branch, and generating a control signal; and a control circuit, coupled to said plurality of data identifiers, for combining low frequency telephone signals from the plurality of network branches into a single signal, in response to said control signal from each one of said plurality of data identifiers.

24. A method of providing combined telephone and video signal communication via a network of coaxial cables comprising the steps of:

(a) dividing a frequency spectrum of a coaxial cable into a low frequency subsplit channel and a high frequency supersplit channel;

(b) transmitting combined video and telephone signals in a first direction from a central office/head end toward a coaxial cable termination, in said supersplit channel;

(c) tapping off a predetermined portion of a video portion of said combined video and telephone signals being transmitted in said first direction, for transmission to subscribers;

(d) converting, at a coaxial cable termination, a telephone portion of said combined video and telephone signals to a lower frequency telephone signal suitable for transmission in said subsplit channel;

(e) transmitting said lower frequency telephone signal in said subsplit channel in a second direction from said coaxial cable termination back toward said central office/head end; and (f) tapping off said lower frequency telephone signal being transmitted in said supersplit channel for transmission to subscribers.

25. The method of claim 24 wherein said step of converting comprises the steps of:

(d)(i) separating said telephone signal portion from said combined telephone and video signals being transmitted in said supersplit channel;

(d)(ii) demodulating said telephone signal to obtain digital telephone signal;

(d)(iii) reconstructing said digital telephone signal to maximize signal to noise ratio of said telephone signal; and (d)(iv) remodulating said reconstructed digital telephone signal using said lower frequency suitable for transmission in said subsplit channel.

26. The method of claim 24 further comprising the steps of:

(g) amplifying said predetermined portion of said video portion tapped off in step (c) to generate an amplified to-subscriber video signal;

(h) demodulating and selecting an appropriate frame of said lower frequency telephone signal tapped off in step (f) and intended for an attached subscriber, to generate a to-subscriber telephone signal;

(i) combining said to-subscriber video signal and said to-subscriber telephone signal into a single combined to-subscriber video and telephone signal; and (h) transmitting said single combined to-subscriber video and telephone signal to a subscriber via a drop cable.

* * * * *